Aug. 6, 1940.  H. D. BRICE  2,210,480
PRESSURE STABILIZER
Filed Oct. 5, 1939
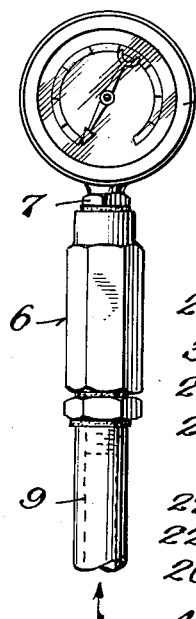
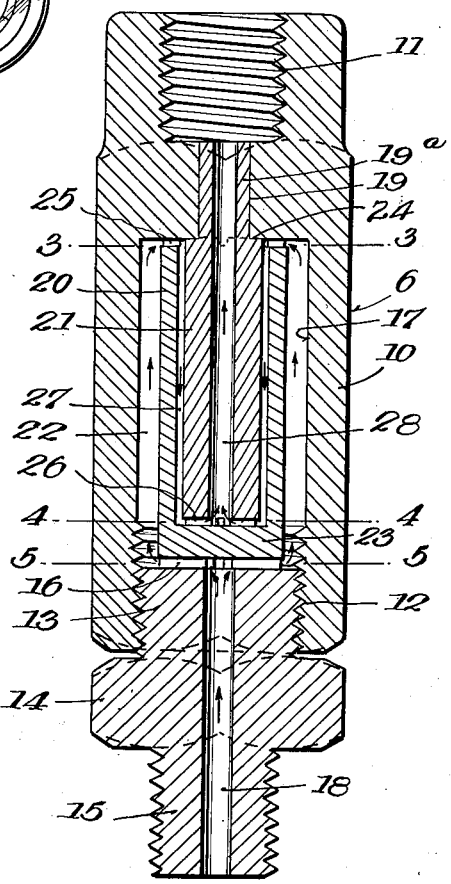
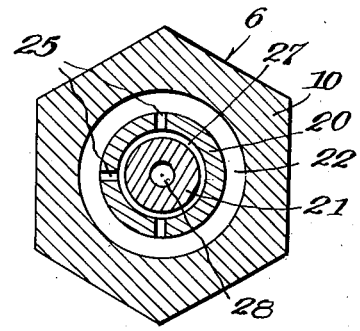
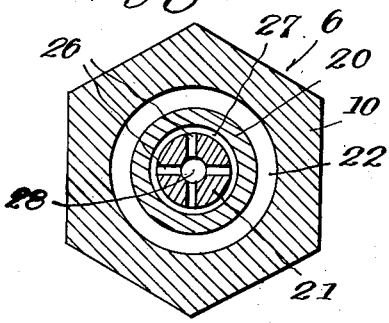
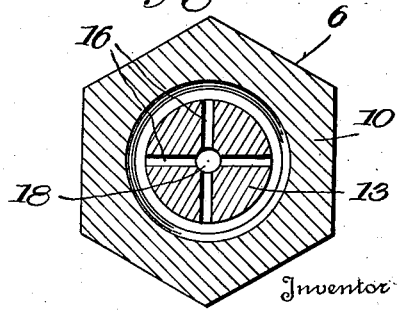
Inventor
H. D. Brice,
By Barry + Cyr
Attorneys Patented Aug. 6, 1940

2,210,480

UNITED STATES PATENT OFFICE 2,210,480

PRESSURE STABILIZER

Hugh D. Brice, Houston, Tex.

Application October 5, 1939, Serial No. 298,119

1 Claim. (Cl. 138—42)

This invention relates to improvements in pressure stabilizers, and more particularly to a device for minimizing or dampening the effect of rapid and extreme pressure changes on the working parts of a pressure gauge.

In ordinary applications of gauges, particularly on steam locomotives, violent shocks are transmitted to the gauge and its working parts, due to sudden and extreme pressure changes in the pressure line. These shocks are imparted to the gauge mechanism and registered by the pointer or indicator. This results in unnecessary and excessive wear of the working parts of the gauge and eventual failure thereof because the indicating mechanism is unable to withstand the severe pressure changes which follow in quick succession.

The primary object of the invention is to supply a stabilizer which will eliminate the above-mentioned objections.

Another object is to produce a device adapted to be interposed between a gauge and a source of pressure and having a restricted and preferably tortuous passageway therethrough which will permit the gradual flow of fluid with changes in pressure, but which, under sudden changes in pressure, will restrict the flow of the fluid to such an extent that momentary fluctuations of pressure will not be indicated on the gauge.

A further object is to supply a device of this character having a stabilizing chamber adapted to dampen or retard rapid and extreme pressure changes in the line before such changes affect the indicating mechanism of the gauge.

Another object is to furnish a pressure stabilizer which can be readily attached to any fluid pressure recording gauge, and which will enable the latter to register a steady mean pressure in the line regardless of sudden and extreme pressure changes in said line.

A still further object is to provide a pressure stabilizer of this character which is small and compact, and yet provides a relatively long and unrestricted passageway therethrough for the pressure fluid before the latter acts on the recording gauge.

Still another object is to produce a simple and inexpensive device and yet one which will be exceedingly effective for the purpose for which it is designed.

With the above and other objects in view which will appear as the description proceeds, the invention consists in the novel features hereinafter described in detail, illustrated in the accompanying drawing, and more particularly pointed out in the appended claim.

In the drawing:

Fig. 1 is an elevational view of my stabilizer interposed in a pressure line and connected to a conventional gauge.

Fig. 2 is an enlarged vertical sectional view of the device.

Figs. 3, 4 and 5 are horizontal sectional views, taken respectively, on the lines 3—3, 4—4 and 5—5 of Fig. 2.

Referring to the drawing in detail, 6 designates my improved pressure stabilizer connected at one end to a nipple 7 leading to a gauge 8, and connected at its opposite end to a pressure line 9 containing steam, water, air, or other fluid under pressure.

As illustrated in Figs. 2 to 5 inclusive, the stabilizer consists of a tubular body member or shell 10 having an internally threaded end portion 11 for connection to the nipple 7 of the gauge 8. The opposite end portion is also internally threaded as indicated at 12 and adapted to receive one end 13 of a threaded hexagonal nipple 14, the other end 15 of said nipple being adapted for connection to the pressure line 9. The upper end surface of the portion 13 of the nipple is provided with a plurality of radial grooves 16 for a purpose hereinafter described.

The body 10 is provided intermediate its ends with a chamber 17 communicating (by means of grooves 16) with the pressure line 9 through the bore 18 in the nipple 14, whereby fluid under pressure from said line may flow into the stabilizer.

A bore 19 of the body snugly receives a reduced extension 19a of a hollow stem 21 which is encircled by a cup 20 arranged in the chamber 17. The body and cup form an annular passageway 22 which communicates with the grooves 16, and the mouths of the latter are closed by the bottom 23 of the cup which rests on the upper end of the threaded extension 13 of the nipple 14. Obviously the grooves might be cut in the bottom of the cup instead of the upper end of the extension 13.

A shoulder 24 of the hollow stem abuts against the upper end of the chamber 17 and the upper edge of the cup has radial grooves 25 to allow the fluid to flow from the passageway 22 into a second annular passageway 27 arranged between the wall of the cup and the hollow stem. Of course, the grooves 25 could be formed in the upper end of the chamber 17 instead of the upper edge of the cup if this is desired.

Other radial grooves 26 are formed in the lower edge of the stem 21 and place the passageway 27 in communication with the bore 28 of the hollow stem. Here again, the grooves 26 might obviously be formed in the closed bottom 23 of the cup instead of in the lower edge of the stem.

In operation, it will be understood that the parts are immovable relatively to one another and if the fluid pressure rises at its source, it will flow through 18, 16, 22, 25, 27, 26 and 28 into the gauge 8.

The device provides restricted passage which will permit the flow of fluid gradually with changes of pressure, but which under sudden changes in pressure will restrict the flow of the fluid to the extent that momentary fluctuations of pressure are not indicated on the gauge. It has been found in practice that the stabilizer herein disclosed will accomplish the purpose in a better manner than one embodying a single small orifice. My device has the advantage of eliminating the machining of the extremely small orifice necessary to accomplish the same effect, and is not as subject to the clogging which has been found to be a decided disadvantage with the use of an extremely small orifice.

It will be understood from the description of the device that if the body 10 is turned relatively to the nipple 14, the ports 25 and 26 may be adjusted to vary the size thereof so as to obtain the desired constriction to limit the swing of the gauge pointer to the required range.

While I have disclosed what I now consider to be a preferred embodiment of the invention in such manner that the same may be readily understood by those skilled in the art, I am aware that changes may be made in the details disclosed without departing from the spirit of the invention as expressed in the claim.

What I claim and desire to secure by Letters Patent is:

A stabilizer adapted to be interposed between a source of pressure and a pressure gauge comprising a substantially cup-shaped tubular body having an internal chamber, a nipple detachably connected to one end of the body and forming one end of said chamber, an inlet port extending through said nipple, an outlet port arranged at the opposite end of the body, a cup held fixedly in the chamber by said nipple and having a closed end confronting said inlet port, said cup having an annular wall, restricted passageways arranged at the closed end of the cup and communicating with said inlet port, an annular passageway arranged between said wall and the body and communicating with said restricted passageways, a tubular stem having one of its ends rigidly secured to the body and projecting into said cup, the bore of the stem communicating with said outlet port, a second annular passageway arranged between said wall and stem, second restricted passageways placing the annular passageways in communication at the mouth of said cup, other restricted passageways arranged between the bottom of the cup and the inner end of the stem and placing the bore of the stem in communication with said second annular passageway, said nipple serving to clamp the mouth of the cup against the body and the bottom of the cup against the inner end of the stem.

HUGH D. BRICE.